Oct. 26, 1965  J. W. SMITH  3,213,915
ADAPTER FOR TUBELESS TIRE VALVE AND ASSEMBLY
Filed April 13, 1964
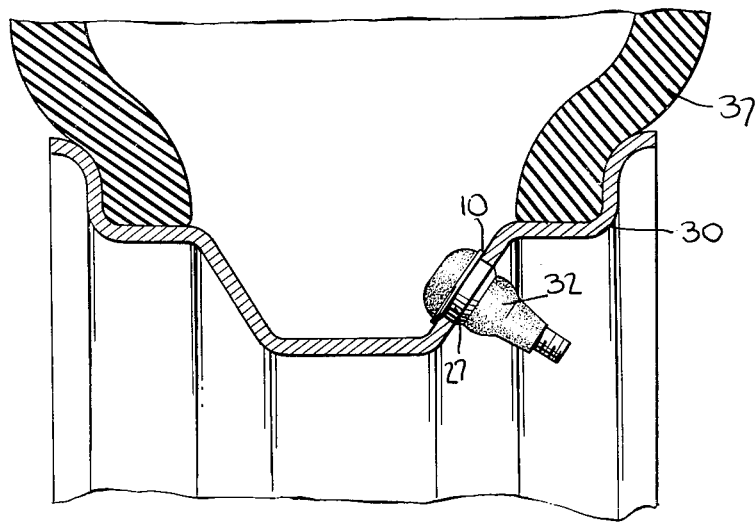
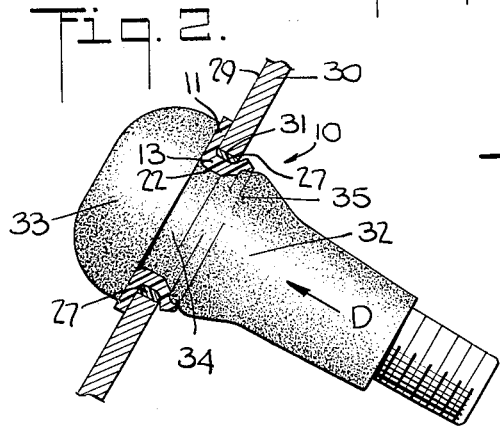
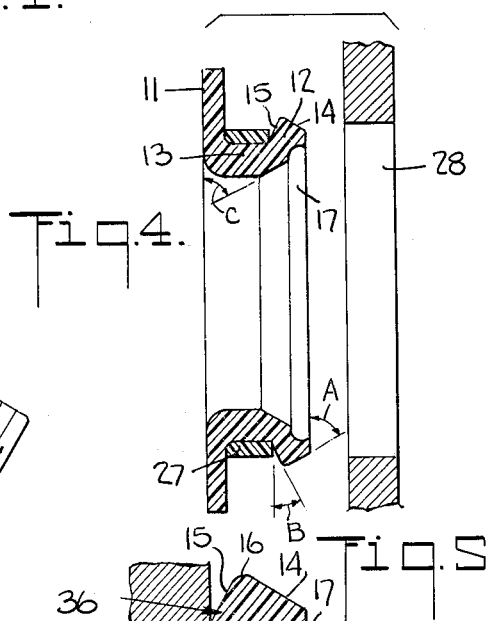
JOSEPH W. SMITH
BY Kenyon & Kenyon
ATTORNEYS

United States Patent Office 3,213,915
Patented Oct. 26, 1965

3,213,915
ADAPTER FOR TUBELESS TIRE VALVE
AND ASSEMBLY
Joseph W. Smith, 45 Pert St., Trumbull, Conn.
Filed Apr. 13, 1964, Ser. No. 358,999
13 Claims. (Cl. 152—427)

This invention relates to an assembly for adapting a tubeless tire valve to an automotive rim hole of larger diameter than normal for said valve member.

Heretofore, it has been necessary to maintain inventories of tubeless tire valves of more than one size where it has been necessary or desirable to service automotive rims with varying diameter rim holes. For example, although there has been general standardization of tubeless valves, two common sizes in use today are for use respectively with rim holes of 0.453" in diameter and 0.625" in diameter. A company stocking tubeless tire valves must carry both sizes in the various lengths of those sizes in order to handle all requirements.

The present invention is intended to supply a means by which it would only be necessary to stock the more common of the two valves and when a requirement for the larger rim hole is encountered, the supplier need only supply a valve for the smaller diameter size, namely, 0.453" and an adapter. In this fashion, the size of tubeless valve inventory is substantially reduced and greater convenience is provided for servicing both rim hole sizes in an inexpensive manner. Furthermore, features are included in the adapter to enhance mechanical engagement and retention of the adapter and valve assembly by the rim hole portion of the rim.

Briefly, the invention comprises a plastic ferrule or sleeve having end flanges, one flange being of a diameter substantially greater than the rim hole and being adapted for abutment with the tire-engaging side of the rim. The other end flange is of lesser diameter than the first flange and is beveled to provide axially inner and outer angular faces meeting at a radially outermost juncture of greater diameter than said rim hole but having sufficient resilience so that it can be manually forced through said rim hole from the tire-engaging side of the rim.

The axially inner angular face is adapted for engagement with the edge of the rim hole portion for mechanically restraining axial movement of the ferrule back through the rim hole. An annular recessed portion is included on the inside of the beveled flange adjacent the end of the ferrule and constitutes a lateral thrust expansion chamber for the adjacent portion of the valve member.

An angular bearing surface joins the recessed portion with the intermediate tubular portion of the ferrule and is adapted to transmit axial thrust of the valve member into a lateral component.

A tubular rubber gasket is disposed around the outer cylindrical face of the ferrule and is adapted to provide a pneumatic seal between the edge of the rim hole and the ferrule.

Other objects and features of the invention will become apparent in the following specification and claims, and in the drawings in which:

FIG. 1 is a partially sectioned assembly view;

FIG. 2 is an enlarged assembly view;

FIG. 3 is an exploded section of the ferrule and gasket assembly;

FIG. 4 is an enlarged section of the ferrule and gasket shown in relation to the rim hole; and FIG. 5 is an enlarged fragmentary section of the beveled flange and rim hole engagement.

Referring now to the drawings, particularly FIGS. 3 and 4, the ferrule or collar is designated generally by reference numeral 10. It has an enlarged flat laterally extending base flange 11, an oppositely disposed beveled flange 12 and a cylindrical body portion 13. The base flange 11 is of substantially greater diameter, e.g., $^{27}\!/_{32}$ of an inch in comparison with the diameter of the beveled flange 12 which has a corresponding diameter of, for example, 0.660–0.665". The beveled flange 12 has an axially outer angular face 14 and an axially inner angular face 15 which meet at a radially outer juncture 16. The plane of the angular face 14 forms an acute angle A with the plane of base flange 11 of about 60° and the plane of angular face 15 forms an acute angle B with the plane of base flange 11 of about 25°. Annular cavity or recess 17 is provided adjacent the beveled flange end 18 of ferrule 10 on the radially inner surface 19 of said ferrule and extends generally continuously around the entire circumference thereof. Angular bearing surface 20 is disposed adjacent the inner edge 21 of the ferrule and extends angularly inwardly to merge with the cylindrical inner surface 22 of the intermediate portion 23 of the ferrule at a point 24 substantially opposite the corresponding juncture 25 of the angular face 15 with the outer surface 26 of said intermediate portion 23. The rubber gasket member 27 of generally cylindrical shape is dimensioned to fit snugly against the outer surface 26 of intermediate portion 23 of the ferrule as shown in FIG. 4.

The ferrule may be fabricated from any suitable plastic material or the like, for instance, polyethylene, exemplary properties having a tensile strength of the material of 2250 p.s.i., a durometer "D" hardness of 56, no load distortion temperature of 250° F., low temperature brittleness at about —25° F., and a room temperature toughness of DNB (does not break). A ferrule having the above flange diameter as previously stated, and the angles A, B and C as previously stated, would have a corresponding outer diameter of the intermediate portion of 0.575", inner diameter of 0.448", end to end length of 0.200" and thickness from beveled end to inner end of bearing surface of 0.0796". The curvature of the annular recess would be about $^{1}\!/_{32}$ of an inch and the axial distance from beveled end to peripheral juncture of angular faces of 0.045". The distance from the peripheral juncture to the axially inner face of the base flange is 0.115–.120". The rubber gasket may be of any suitable material such as butyl rubber and corresponding to the above recited dimensions for the ferrule would have an inner diameter of 0.575", an outer diameter of 0.620" and a length of 0.010". All of these dimensions are approximate to give an idea of the order of magnitude for one particular embodiment of the invention.

In the assembled condition as shown in FIGS. 1, 2 and 5, the ferrule 10 is disposed in the rim hole 28 with its base flange 11 abutting against the tire-engaging side 29 of rim 30 as shown. Rubber gasket 27 is disposed between the intermediate portion 13 of the ferrule and the rim hole edge portion 31 to provide a pneumatic seal therebetween. The tubeless tire valve member 32 which is of standard construction is disposed with its enlarged inner end portion 33 in engagement with base flange 11, its outer annular recessed portion 34 engaging the inner surface 22 of the ferrule 10 and its bead portion 35 engaging the bearing surface 20 and annular cavity 17 of the ferrule.

The tendency of a tubeless tire valve at least under certain prevailing conditions of use is to respond to the normal tensioning strain thereon by passing backward in the direction of arrow D through the rim hole 28. The present invention has certain features which are designed to counteract the reversing tendency of the tire valve. Annular recess 17 and bearing surface 20 convert the reverse thrust of the tire valve member 32 into radial or lateral components E and F respectively. In addition, axially inner angular surface 15 engages the rim hole edge portion 36 to mechanically lock the adapter assembly against axial movement in the direction of arrow D (see particularly FIG. 5). This engagement also contributes to the pneumatic seal of the adapter with respect to the rim. The above features prevent the tension forces of the tire valve member from pushing the assembly back through the rim hole.

The base flange 11 constitutes the main support of the assembly and is dimensioned so that the pressure behind it will not extrude the adapter assembly through the rim hole. It is desirable that the base flange be equal to or greater than the maximum diameter of the tire valve bottom portion 33.

The anguluar surface 14 of the beveled flange 12 is shaped to provide the best mechanical advantage for the mass, to permit forcing the flange through the rim hole during assembly and the stated angle provides optimum conditions for this feature.

In use, the plastic ferrule and rubber gasket are usually assembled at the factory and shipped as a unit. The ferrule and gasket assembly can be inserted into the rim hole by hand and thereafter the tubeless valve is inserted in the regular manner to provide the assembly shown in FIG. 1 which shows the arrangement of parts including the tubeless tire 37, rim 30, tire valve 32, gasket 27 and ferrule 10.

The present invention thus provides an adapter assembly for fulfilling the objects previously stated. The ferrule and gasket arrangement provide a mechanically locked, pneumatically tight structure having the above-described novel axial thrust converting properties.

It is to be understood that certain changes and additions may be made by those skilled in the art, without departing from the scope and spirit of the invention.

I claim:

1. An assembly for adapting a tubeless tire valve member for positioning in a rim hole of larger diameter than normal for said valve member comprising a ferrule having a first flange at one end thereof, said ferrule having an intermediate tubular portion, a second beveled flange on said ferrule having axially inner and outer angular faces meeting at a radially outermost juncture of greater diameter than said rim hole, an annular recessed portion on the inside of said second flange, an angular surface joining said recessed portion with said intermediate tubular portion, and a tubular gasket disposed around the outer surface of said intermediate tubular portion of said ferrule.

2. An assembly for adapting a tubeless tire valve member for positioning in a rim hole of larger diameter than normal for said valve member comprising a ferrule having a first laterally extending flange at one end thereof with a diameter substantially greater than the rim hole for which it is adapted for use, said ferrule having an intermediate tubular portion, a second beveled flange at the other end of said ferrule having axially inner and outer angular faces meeting at a radially outermost juncture of greater diameter than said rim hole, an annular recessed portion on the inside of said second flange adjacent the end of said ferrule, an angular surface joining said recessed portion with said intermediate tubular portion, and a tubular gasket disposed around the outer surface of said intermediate tubular portion of said ferrule.

3. An assembly for adapting a tubeless tire valve member for positioning in a rim hole of larger diameter than normal for said valve member comprising a ferrule having a first relatively elongated laterally extending flange at one end thereof with a diameter substantially greater than the rim hole for which it is adapted for use, said flange being adapted for abutment with the tire-engaging side of the rim to retain said ferrule in said rim hole against further outward axial movement thereof, said ferrule having an intermediate tubular portion, a second relatively narrow beveled flange at the other end of said ferrule having axially inner and outer angular faces meeting at a radially outermost juncture of greater diameter than said rim hole, said axially inner angular face adapted for engagement with the edge of the rim hole portion for restraining axial movement of said ferrule back through the rim hole, an annular recessed portion on the inside of said second flange adjacent the end of said ferrule, an angular bearing surface joining said recessed portion with said intermediate tubular portion, and a tubular gasket disposed around the outer surface of said intermediate tubular portion of said ferrule and being adapted to provide a pneumatic seal between said rim and said ferrule.

4. An assembly for adapting a tubeless tire valve member for positioning in a rim hole of larger diameter than normal for said valve member comprising a ferrule having a first relatively elongated flat laterally extending flange at one end thereof with a diameter substantially greater than the rim hole for which it is adapted for use, said flange being adapted for abutment with the tire-engaging side of the rim to retain said ferrule in said rim hole against further outward axial movement thereof, said ferrule having an intermediate tubular portion including a radially outer cylindrical face, a second relatively narrow beveled flange at the other end of said ferrule having axially inner and outer angular faces meeting at a radially outermost juncture of greater diameter than said rim hole, said second flange having sufficient resilience so that it can be forced through said rim hole from said tire-engaging side of said rim, said axially inner angular face adapted for engagement with the edge of the rim hole portion for restraining axial movement of said ferrule back through the rim hole, an annular recessed portion on the inside of said second flange adjacent the end of said ferrule, an angular bearing surface joining said recessed portion with said intermediate tubular portion, and a tubular gasket disposed around said outer cylindrical face of said ferrule and being adapted to provide a pneumatic seal between said rim and said ferrule.

5. An assembly for adapting a tubeless tire valve member for positioning in a rim hole of larger diameter than normal for said valve member comprising a ferrule having a first relatively elongated flat laterally extending flange at one end thereof with a diameter substantially greater than the rim hole for which it is adapted for use, said flange being adapted for abutment with the tire-engaging side of the rim to retain said ferrule in said rim hole against further outward axial movement thereof, said ferrule having an intermediate tubular portion including a radially outer cylindrical face, a second relatively narrow beveled flange of lesser diameter than said first flange at the other end of said ferrule having axially inner and outer angular faces meeting at a radially outermost juncture of greater diameter than said rim hole, said second flange having sufficient resilience so that it can be manually forced through said rim hole from said tire-engaging side of said rim, said axially inner angular face adapted for engagement with the edge of the rim hole portion for restraining axial movement of said ferrule back through the rim hole, an annular recessed portion on the inside of said second flange adjacent the end of said ferrule, an angular bearing surface joining said recessed portion with said intermediate tubular portion, and a tubular gasket disposed around said outer cylindrical face of said ferrule and being adapted to provide a pneumatic seal between the edge of said rim hole and said ferrule.

6. An assembly for adapting a tubeless tire valve member for positioning in a rim hole of larger diameter than normal for said valve member comprising a ferrule having a first relatively elongated flat laterally extending flange at one end thereof with a diameter substantially greater than the rim hole for which it is adapted for use, said flange being adapted for abutment with the tire-engaging side of the rim to retain said ferrule in said rim hole against further outward axial movement thereof, said ferrule having an intermediate tubular portion including a radially outer cylindrical face, a second relatively narrow beveled flange of lesser diameter than said first flange at the other end of said ferrule having axially inner and outer angular faces meeting at a radially outermost juncture of greater diameter than said rim hole, said second flange having sufficient resilience so that it can be manually forced through said rim hole from said tire-engaging side of said rim, said axially inner angular face adapted for engagement with the edge of the rim hole portion for restraining axial movement of said ferrule back through the rim hole, an annular recessed portion on the inside of said second flange adjacent the end of said ferrule constituting a lateral thrust expansion chamber for the adjacent portion of said valve member, an angular bearing surface joining said recessed portion with said intermediate tubular portion adapted to transmit backward axial thrust of said valve member into a lateral component and a tubular gasket disposed around said outer cylindrical face of said ferrule and being adapted to provide a pneumatic seal between the edge of said rim hole and said ferrule.

7. An assembly for adapting a tubeless tire valve member for positioning in a rim hole of larger diameter than normal for said valve member comprising a plastic ferrule having a first relatively elongated flat laterally extending flange at one end thereof with a diameter substantially greater than the rim hole for which it is adapted for use, said flange being adapted for abutment with the tire-engaging side of the rim to retain said ferrule in said rim hole against further outward axial movement thereof, said ferrule having an intermediate tubular portion including a radially outer cylindrical face, a second relatively narrow beveled flange of lesser diameter than said first flange at the outer end of said ferrule having axially inner and outer angular faces meeting at a radially outermost juncture of greater diameter than said rim hole, said second flange having sufficient resilience so that it can be manually forced through said rim hole from said tire-engaging side of said rim, said axially inner angular face adapted for engagement with the edge of the rim hole portion for restraining axial movement of said ferrule back through the rim hole, an annular recessed portion on the inside of said second flange adjacent the end of said ferrule constituting a lateral thrust expansion chamber for the adjacent portion of said valve member, an angular bearing surface joining said recessed portion with said intermediate tubular portion adapted to transmit backward axial thrust of said valve member into a lateral component, and a tubular rubber gasket disposed around said outer cylindrical face of said ferrule and being adapted to provide a pneumatic seal between the edge of said rim hole and said ferrule.

8. In combination a rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a ferrule disposed in said annular groove and having a first flange at one end thereof, said ferrule having an intermediate tubular portion, a second beveled flange at the other end of said ferrule having axially inner and outer angular faces meeting at a periphery of greater diameter than said rim hole, said axially inner angular face engaged by the edge of the rim hole portion, an annular recessed portion on the inside of said second flange, and a tubular gasket disposed on the outer surface of said intermediate tubular portion of said ferrule and providing a pneumatic seal between the edge of said rim hole and said ferrule.

9. In combination a rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a ferrule disposed in said annular groove and having a first relatively elongated flange at one end thereof, said ferrule having an intermediate tubular portion, a second relatively narrow beveled flange of lesser diameter than said first flange at the other end of said ferrule having axially inner and outer angular faces meeting at a periphery of greater diameter than said rim hole, said axially inner angular face engaged by the edge of the rim hole portion, an annular recessed portion on the inside of said second flange, and a tubular gasket disposed on the outer surface of said intermediate tubular portion of said ferrule and providing a pneumatic seal between the edge of said rim hole and said ferrule.

10. In combination a rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a ferrule disposed in said annular groove and having a first relatively elongated laterally extending flange at one end thereof, said flange abutting the tire-engaging side of said rim, said ferrule having an intermediate tubular portion, a second relatively narrow beveled flange of lesser diameter than said first flange at the other end of said ferrule having axially inner and outer angular faces meeting at a periphery of greater diameter than said rim hole, said second flange having sufficient resilience so that it can be forced through said rim hole from said tire-engaging side of said rim, said axially inner angular face engaged by the edge of the rim hole portion, an annular recessed portion on the inside of said second flange, and a tubular gasket disposed on the outer surface of said intermediate tubular portion of said ferrule and providing a pneumatic seal between the edge of said rim hole and said ferrule.

11. In combination a rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a ferrule disposed in said annular groove and having a first relatively elongated flat laterally extending flange at one end thereof with a diameter substantially greater than said rim hole, said flange abutting the tire-engaging side of said rim, said ferrule having an intermediate tubular portion, a second relatively narrow beveled flange of lesser diameter than said first flange at the other end of said ferrule having axially inner and outer angular faces meeting at a periphery of greater diameter than said rim hole, said second flange having sufficient resilience so that it can be forced through said rim hole from said tire-engaging side of said rim, said axially inner angular face engaged by the edge of the rim hole portion, an annular recessed portion on the inside of said second flange adjacent the end of said ferrule, an angular bearing surface joining said recessed portion with said intermediate tubular portion, and a tubular gasket disposed on the outer surface of said intermediate tubular portion of said ferrule and providing a pneumatic seal between the edge of said rim hole and said ferrule.

12. In combination a rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a ferrule disposed in said annular groove and having a first relatively elongated flat laterally extending flange at one end thereof with a diameter substantially greater than said rim hole, said flange abutting the tire-engaging side of said rim, said ferrule having an intermediate tubular portion, a second relatively narrow beveled flange of lesser diameter than said first flange at the other end of said flange having axially inner and outer angular faces meeting at a periphery of greater diameter than said rim hole, said second flange having sufficient resilience so that it can be forced through said rim hole from said tire-engaging side of said rim, said axially inner angular face engaged by the edge of the rim hole portion, an annular recessed portion on the inside of said second flange adjacent the end of said ferrule constituting a lateral thrust expansion chamber for the adjacent portion of said valve member, an angular bearing surface joining said recessed portion with said intermediate tubular portion, and a tubular gasket disposed on the outer surface of said intermediate tubular portion of said ferrule and providing a pneumatic seal between the edge of said rim hole and said ferrule.

13. In combination a drop center rim having a rim hole for receiving a tire valve, a tubeless tire mounted on said rim, and an undersized tubeless tire valve and an adapter assembly mounted in said rim hole, said tire valve including an annular groove adapted for mounting adjacent said rim hole, said adapter assembly comprising a plastic ferrule disposed in said annular groove and having a first relatively elongated flat laterally extending flange at one end thereof with a diameter substantially greater than said rim hole, said flange abutting the tire-engaging side of said rim, said ferrule having an intermediate tubular portion, a second relatively narrow beveled flange of lesser diameter than said first flange at the other end of said ferrule having axially inner and outer angular faces meeting at a periphery of greater diameter than said rim hole, said second flange having sufficient resilience so that it can be forced through said rim hole from said tire engaging side of said rim, said axially inner angular face engaged by the edge of the rim hole portion, an annular recessed portion on the inside of said second flange adjacent the end of said ferrule constituting a lateral thrust expansion chamber for the adjacent portion of said valve member, an angular bearing surface joining said recessed portion with said intermediate tubular portion, and a tubular rubber gasket disposed on the outer surface of said intermediate tubular portion of said ferrule and providing a pneumatic seal between the edge of said rim hole and said ferrule.

References Cited by the Examiner

UNITED STATES PATENTS

| 2,277,885 | 3/42 | Rodanet. | |
| 2,813,568 | 11/57 | Kilmark | 152—427 |
| 3,087,529 | 4/63 | Morton | 152—427 |

FOREIGN PATENTS

| 203,828 | 10/56 | Australia. |

ARTHUR L. LA POINT, *Primary Examiner.*

UNITED STATES PATENT OFFICE
CERTIFICATE OF CORRECTION

Patent No. 3,213,915                         October 26, 1965

Joseph W. Smith

It is hereby certified that error appears in the above numbered patent requiring correction and that the said Letters Patent should read as corrected below.

Column 5, line 34, for "outer" read -- other --; column 6, line 74, for "flange", second occurrence, read -- ferrule --.

Signed and sealed this 24th day of May 1966.

(SEAL)
Attest:

ERNEST W. SWIDER                      EDWARD J. BRENNER
Attesting Officer                         Commissioner of Patents